C. C. BOLES.
LEVEL.
APPLICATION FILED JAN. 20, 1912.
1,057,924.
Patented Apr. 1, 1913.
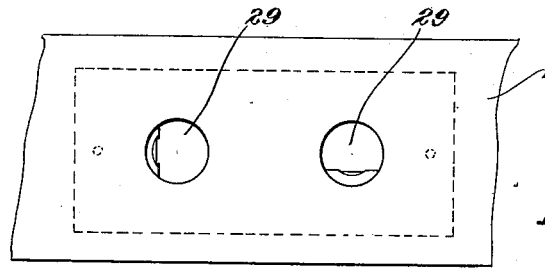
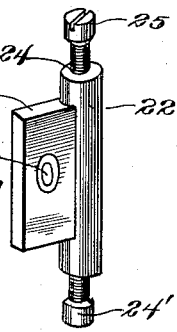
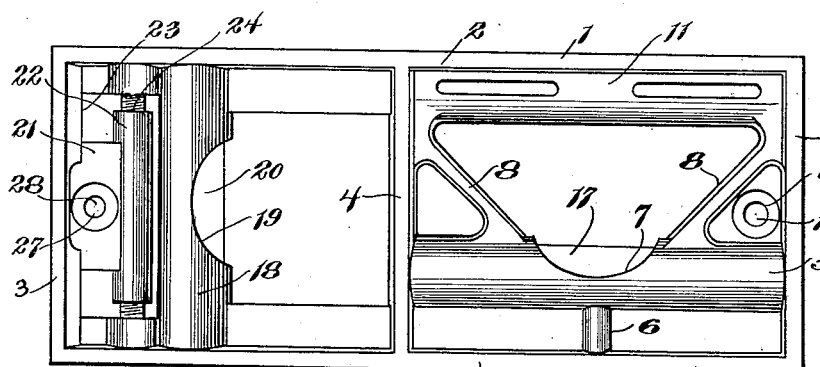
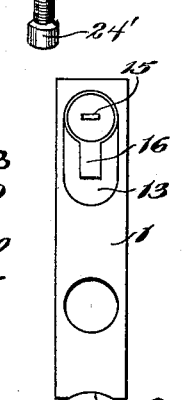
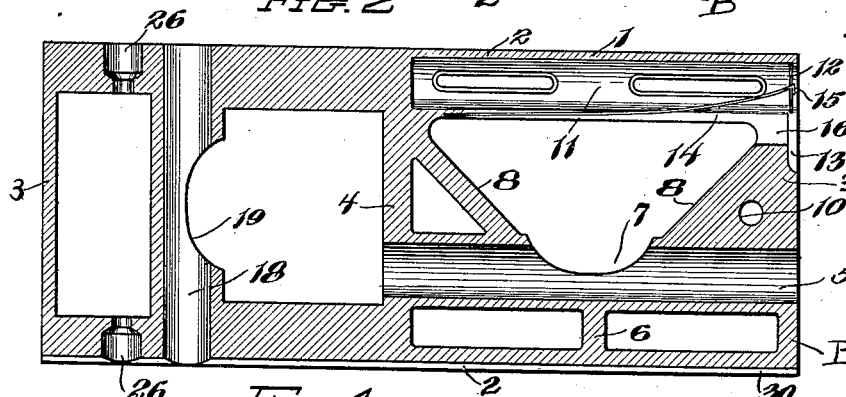
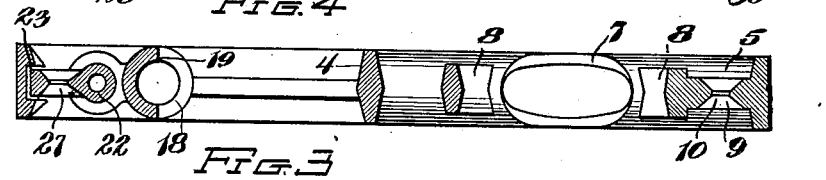
Witnesses
W. H. Mulligan
John J. McCarthy
Inventor
Christopher C. Boles.
By Victor J. Evans
Attorney
COLUMBIA PLANOGRAPH CO., WASHINGTON, D. C.

UNITED STATES PATENT OFFICE.

CHRISTOPHER C. BOLES, OF SAGINAW, MICHIGAN.

LEVEL.

1,057,924.   Specification of Letters Patent.   Patented Apr. 1, 1913.

Application filed January 20, 1912. Serial No. 672,292.

*To all whom it may concern:*

Be it known that I, CHRISTOPHER C. BOLES, a citizen of the United States of America, residing at Saginaw, in the county of Saginaw and State of Michigan, have invented new and useful Improvements in Levels, of which the following is a specification.

This invention relates to improvements in levels and has particular application to a combined plumb and level.

In carrying out the present invention, it is my purpose to provide an instrument of this type which may be attached to a straight edge and adjusted thereon after such attachment to properly position or locate the instrument upon the straight edge, whereby the instrument may be easily and quickly swung or adjusted upon the straight edge in the smallest fraction of a degree, the instrument being at the same time rigidly clamped to the straight edge to prevent mutilation or displacement of the former.

Furthermore, I aim to provide an instrument of this character wherein are employed two spirit tubes arranged at right angles to each other so that when the instrument is adjusted to ascertain the level, a plumb adjustment is simultaneously obtained, and vice versa, owing to the position of the tubes.

A still further object of the invention is the provision of an instrument of this class wherein the weight of the plumb and level is equally distributed or balanced around a common central point so as to permit convenient handling of the instrument when the latter is used independently of the straight edge, this balancing of the instrument being necessary in order to facilitate the use of the instrument for various purposes.

The invention has for a still further object, the provision of an instrument of this type wherein the construction or design of each tube and the connections between the tubes are symmetrical or equally balanced whereby the position of the glasses at right angles to each other may be at all times assured independently of temperature variation and other changes which are met with in the use of the instrument.

A still further object of this invention is the provision of an instrument of this type which shall embody among other features a frame capable of attachment to and detachment from a straight edge or the like and carrying a plurality of right angularly arranged spirit tubes, and means associated with the frame to permit the adjustment thereof subsequent to the application and fastening of the latter to the straight edge, the frame being provided with a pocket or receptacle designed for the reception of the fastening device and closed by a spring actuated shutter. This pocket or receptacle is adapted to hold a fastening means when the instrument is used independently of the straight edge.

With the above and other objects in view which will appear as the description progresses, the invention consists in the construction, combination and arrangement of parts hereinafter set forth in and falling within the scope of the appended claims.

In the accompanying drawing forming a part of this specification in which has been illustrated what I now consider to be the preferred embodiment of the invention; Figure 1 is a view in elevation showing an instrument constructed in accordance with the present invention and applied to a straight edge. Fig. 2 is a front elevation of an instrument constructed in accordance with the present invention the same being detached from a straight edge. Fig. 3 is a horizontal longitudinal sectional view of the same. Fig. 4 is a vertical central sectional view of the instrument, the spirit tubes being removed. Fig. 5 is an end view thereof, and Fig. 6 is a detail perspective view of the adjusting means.

Similar reference characters designate like parts throughout the several views.

Referring to the accompanying drawings in detail, A designates a straight edge or the like, one side of which is adapted to receive and securely hold the instrument B forming the subject-matter of the present invention. The instrument B, in the present instance, includes a frame 1 of substantially rectangular contour and constructed from cast iron or other well known or preferred metal capable of withstanding the usage to which instruments of this character are subjected. This frame 1 is composed of longitudinal and transverse side and end bars 2 and 3 respectively and an intermediate division bar 4 which latter coöperates with one of the end bars 3 to support a horizontally disposed metallic tubi-form shell 5 connected to the said bars 3 and 4 in any suitable manner or formed integral therewith, if desired. A post 6 is interposed between the shell 5 and what may be termed the lower longitudinal bar 2 and this post is arranged centrally of the shell to reinforce and hold the latter within the frame. Immediately above the post the shell 5 is cut away to present a semicircular opening 7. Connecting the shell to the bars 3 and 4 upon opposite sides of such opening are diagonally arranged braces 8, 8 one of which latter has an intermediate web 9 formed with a counter-sunk aperture 10 designed to receive a screw or other suitable fastening device to facilitate the application of the instrument to the straight edge and retain the same in position thereon.

Formed integral with the upper longitudinal bar 2 of the frame 1 or otherwise suitably connected thereto is a receptacle 11 shown, in the present embodiment of the invention, to be of cylindrical contour and disposed intermediate the division bar 4 and one end bar 3. This receptacle as illustrated opens at one end on to the above mentioned bar 3 and is equipped with a shutter 12 designed for sliding movement within a recess 13 in the said end bar and is spring actuated to closed position through the medium of a spring 14 connected to the lower wall of the receptacle 11 in any suitable manner and connected to the shutter 12 at the center of the latter, the connecting end of the spring projecting a suitable distance beyond the shutter to provide a finger hold 15 to permit the removal of the shutter from the opening in the receptacle so that access may be had to the interior of such receptacle. The end bar 3 is slotted as at 16 contiguous the recess 13 therein to accommodate the movement of the spring 14 in the actuation of the shutter. Mounted within the shell 5 is a spirit tube 17 of any conventional or preferred form designed for leveling purposes and this tube is secured within the shell by any well known or preferred means to prevent accidental displacement of the tube and to allow the removal of the tube in the event of the same becoming broken or otherwise disabled so that a new tube may be inserted within the shell.

The numeral 18 designates a tubiform shell, arranged within the frame 1 of the instrument at right angles to the shell 5 and spaced a suitable distance therefrom, the shell 18 being cut away as at 19 to provide a sight opening. This shell 18 is connected to the longitudinal bars 2 of the frame of the instrument in any suitable manner although, in the present embodiment of the invention I have shown the tube integral with the said bars. It is conceivable, however, that the shell 18 as well as the tube 5 may be connected to the frame 1 in any suitable manner or by any well known or preferred means. Mounted within the shell 18 and secured therein in any desirable manner or by any suitable means, is a spirit tube 20 designed for plumbing purposes and in accordance with such purposes, this tube is arranged at right angles to the tube 17 and is preferably adjustable simultaneously therewith, so that a level and plumb may be found at the same time.

When the instrument is applied to a straight edge, and it is desired to adjust the former relatively to the latter so that a correct reading may be obtained from the level and plumb tubes and for this, and other purposes I have provided an adjusting mechanism or means which, in the preferred form of the invention, consists of an adjusting plate 21 formed integral with a post 22 and designed for sliding movement, under the action of the post, in a groove 23 formed vertically in the opposite end bar 3 of the frame 1. The post 22 is preferably hollowed out and threaded interiorly to receive the threaded shank of a screw 24, which is equipped at one end with a slotted head 25, and passes through alining openings 26, 26 formed in the longitudinal bars 2, 2 at a point adjacent the shell 18 so that in the movement of the screw, the frame 1 and consequently the sight tubes may be adjusted or moved vertically relatively to the adjusting plate of the instrument, the frame 1 in such adjustment or movement riding or sliding on the plate 21 incident to the groove 23 within the end bar 3 just mentioned. A nut 24' is securely fastened within one of the openings 26 and within this nut the free end of the screw shank is swiveled or otherwise loosely secured to permit movement of the screw with respect to the nut in the adjusting of the instrument. This plate 21 is formed with a counter-sunk opening 27 for the purpose of receiving a screw 28 or other fastening device designed to coöperate with the fastening device in the aperture 10 hereinbefore referred to to facilitate the application of the instrument to a straight edge and secure the same thereto against accidental displacement. Thus, it will be seen that, when the instrument has been applied to the straight edge and it is desired to adjust the former with respect to the latter, such adjustment may be obtained by manipulating the screw 24, whereby the instrument, as a whole, will be moved about the fastening device within the opening 10 as a pivot, incident to the plate 21 and consequently the post 22 being rigidly secured to the side of the straight edge, thus, insuring the proper positioning of the level and plumb tubes.

The straight edge A is formed with centrally arranged spaced peep holes 29, 29 so that a reading may be obtained from the instrument at either side of the straight edge and, owing to the arrangement of these peep holes, it will be noted that the instrument may be applied to either side of the straight edge and positioned thereon in any suitable manner without affecting the proper working or functioning of the instrument. Furthermore, it will be seen that the instrument may be attached to the straight edge at right angles to the plane of the latter, that is when the straight edge is in a vertical position, the instrument may be applied thereto and arranged at right angles to the position of the straight edge or in a horizontal plane, and again, the straight edge when positioned in the horizontal may be turned over, that is set up on either of its edges and the instrument attached thereto, thereby permitting reversal of the straight edge, when one of the edges or ends of the same becomes mutilated, and a correct reading of the instrument obtained in view of the arrangement of the peep holes therein. Thus it will be understood that the instrument may be attached to one side of the straight edge in either of four positions and at the same time maintain an operative position with respect to the straight edge. Incident to the mounting of the instrument upon the straight edge, the former may be used as an inclinometer, in connection with the straight edge, by marking the pitch of incline on the straight edge and adjusting the level to such pitch. In the use of the instrument without the straight edge, the screws or fastening devices mounted within the openings 10 and 27 may be disposed within the pocket or receptacle 11 to prevent their loss. The under side of the lower longitudinal bar 2 of the instrument is preferably grooved lengthwise as at 30 to permit the application of the instrument to shafting and the like.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described my invention, what I claim as new and desire to secure by Letters Patent is:

1. In an instrument of the class described, a casing, a frame, spirit tubes within said frame and disposed at right angles to each other, a receptacle carried by said frame, a shutter adapted to close said receptacle, means actuating the shutter to closed position, and means operable to actuate the shutter to open said receptacle.

2. The combination with a straight edge, of a combined leveling and plumbing instrument, said instrument including a frame, spirit tubes within the frame and disposed at right angles to each other, and means for securing said instrument to the straight edge and adjusting the instrument relatively to the straight edge.

3. The combination with a straight edge, of a combined leveling and plumbing instrument, said instrument including a frame, spirit tubes within the frame and disposed at right angles to each other, and means adapted to secure said instrument to the straight edge and adjust the same relatively to said straight edge, said means including a plate carried by the frame and loosely connected thereto, and means operable to move the frame relatively to the plate subsequent to the application of the frame to the straight edge.

4. The combination with a straight edge, of a combined leveling and plumbing instrument, said instrument including a frame having a groove therein, spirit tubes mounted within the frame and disposed at right angles to each other, means for securing said instrument to the straight edge and adjusting the same relatively thereto, said means including a plate adapted to enter the groove in the frame, a post secured to the plate and provided interiorly with screw threads, a screw within the post, and a connection between said screw and frame whereby the latter may be moved relatively to the plate subsequent to the application of the instrument to the straight edge.

5. The combination with a straight edge, of a combined leveling and plumbing instrument, said instrument comprising a frame composed of longitudinal side bars having apertures formed therein, and transverse end bars, one of said end bars being provided with a groove, a plate carried by the frame and disposed partly within the groove therein, a post integral with the plate and provided with internal screw threads, a screw within the post and equipped with a head disposed within the aperture in one of the longitudinal side bars, and a nut loosely mounted on one end of the screw and disposed within the aperture in the opposite longitudinal side bar, whereby the frame may be moved relatively to the plate subsequent to the application of such frame to the straight edge.

In testimony whereof I affix my signature in presence of two witnesses.

CHRISTOPHER C. BOLES.

Witnesses:
G. LEO. WEADOCK,
E. A. HAZENBUSH.

Copies of this patent may be obtained for five cents each, by addressing the "Commissioner of Patents, Washington, D. C."